US006990237B2

(12) United States Patent
Lui et al.

(10) Patent No.: US 6,990,237 B2
(45) Date of Patent: Jan. 24, 2006

(54) IMPLICIT PAGE BREAKS FOR DIGITALLY REPRESENTED HANDWRITING

(75) Inventors: Charlton E. Lui, Redmond, WA (US); Anthony S. Smith, Sammamish, WA (US); Dan W. Altman, Kirkland, WA (US); Cynthia C. Tee, Bellevue, WA (US); Evan M. Feldman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 45 days.

(21) Appl. No.: 10/866,130

(22) Filed: Jun. 14, 2004

(65) Prior Publication Data

US 2004/0234130 A1   Nov. 25, 2004

Related U.S. Application Data

(63) Continuation of application No. 09/795,983, filed on Feb. 28, 2001, now Pat. No. 6,816,615.

(60) Provisional application No. 60/247,479, filed on Nov. 10, 2000.

(51) Int. Cl.
*G06K 9/00* (2006.01)
*G06F 15/00* (2006.01)

(52) U.S. Cl. ............... 382/187; 382/175; 382/229; 715/525

(58) Field of Classification Search ........ 382/175–176, 382/181, 186–189, 195, 218, 229, 313; 178/18.01, 178/19.01; 345/173, 179; 715/506–508, 715/525

See application file for complete search history.

(56) References Cited

U.S. PATENT DOCUMENTS

| | | | |
|---|---|---|---|
| 4,709,348 A | 11/1987 | Horn et al. |
| 5,349,648 A | 9/1994 | Handley |
| 5,666,139 A | 9/1997 | Thielens et al. |
| 5,708,825 A | 1/1998 | Sotomayor |
| 5,953,735 A | 9/1999 | Forcier |
| 5,963,205 A | 10/1999 | Sotomayor |
| 6,332,039 B1 | 12/2001 | Bando et al. |
| 6,529,920 B1 | 3/2003 | Arons et al. |
| 6,633,672 B1 | 10/2003 | Guzik et al. |

*Primary Examiner*—Daniel Miriam
(74) *Attorney, Agent, or Firm*—Banner & Witcoff, LTD.

(57) ABSTRACT

A logical separation between pages, such as an implicit page break, is introduced to separate text entered during one handwriting session from text entered during another handwriting session. If the user leaves more than a threshold amount of blank space at the bottom of the page immediately preceding the new page, then an implicit page break may be inserted at the beginning of the new page. The amount of blank space left at the end of the preceding page may be combined with other criteria to determine whether to insert an implicit page break. The amount of time elapsed since ink has been captured on the previous page is another factor that may be used by itself or combined with other factors to determine whether to insert an implicit page break into the new page. A change in context, such as a different date or different recognized subject matter labels, is also a factor that may be considered in determining whether to insert an implicit page break.

15 Claims, 9 Drawing Sheets

IMPLICIT PAGE BREAKS FOR DIGITALLY REPRESENTED HANDWRITING

CROSS-REFERENCE TO RELATED APPLICATIONS

This application is a divisional application of prior U.S. application Ser. No. 09/795,983, filed Feb. 28, 2001, (which is now U.S. Pat. No. 6,816,615) which claims the benefit of the Nov. 10, 2000 filing date of U.S. provisional application Ser. No. 60/247,479, filed Nov. 10, 2000 entitled Implicit page breaks for digitally represented handwriting, which is incorporated herein by reference.

TECHNICAL FIELD

The present invention relates generally to formatting digitally represented handwriting. More particularly, the invention relates to inserting implicit page breaks into a digital representation of handwritten text at particular points based upon criteria, including, but not limited to, the amount of blank space left on a previous page, the amount of time elapsed since a previous page was written on, and various types of contextual information that may indicate a new writing session.

BACKGROUND OF THE INVENTION

As used herein the term Tablet PC refers to, by way of example, without limitation, a full-function "MICROSOFT" "WINDOWS" operating system-based personal computer incorporating various convenient and intuitive aspects of pencil and paper into a user's interaction with a PC. Such Tablet PCs provide a very natural way to interact with a computer, namely, by writing on it, without sacrificing the power or utility of various "WINDOWS" operating systems and/or various "WINDOWS" operating system-based desktop applications. As will be apparent, Tablet PCs, as the term is used herein, are not limited to computers running a "WINDOWS" operating system. Instead, a Tablet PC may run any other known, or later-developed, operating system.

Tablet PC's are likely to become increasingly popular for a variety of reasons. For instance, in the context of taking notes during a meeting, a Tablet PC presents less of a barrier between individuals than does a laptop computer. In addition, Tablet PC's allow for capturing of handwritten notes so that Tablet PC users are able to take notes in their own handwriting, in an unobtrusive manner similar to taking handwritten notes with a pen and paper. While providing the simplicity of pen and paper, Tablet PC's have the potential to provide many features and benefits provided by word processors and other personal computer software, including sharing of notes among meeting participants in real-time during a meeting via a wireless communication link, for instance. Additional advantages over pen and paper include, but are not limited to the ability to search notes for particular words, including "fuzzy finds," and the ability to input information in other ways including speaking and any other suitable means for inputting information.

When taking notes on a Tablet PC, handwritten notes will typically be displayed in at least two modes, with different corresponding sizes. In note-taking mode, for instance, the notes are typically displayed the same size as they were inked or written on the Tablet PC. In a reading mode, notes are preferably displayed smaller than in note-taking mode so that a user can view more of the user's notes on a single display screen at one time.

When a Tablet PC user switches from having notes displayed larger to having them displayed relatively smaller, notes that were entered on separate pages by a user will typically be combined onto a single displayed page. This is undesirable under circumstances in which the notes on separate pages do not belong together. For instance, if notes on separate pages relate to different subjects or different meetings, it is desirable from a user's point of view for an implicit page break to be automatically inserted between these pages of notes.

SUMMARY OF THE INVENTION

As mentioned above, Tablet PC's may be used to advantage for taking handwritten notes and entering handwritten text into various types of documents. During a note taking or handwriting session, a Tablet PC user could write on a first page, "turn" or "flip" to another page, and continue to take notes. In other words, a user may write on one or more pages during a single handwriting or note-taking session. A typical example of a handwriting session would be meeting notes from a particular meeting. Notes for a different meeting would typically be considered a separate handwriting, or note taking, session.

In accordance with various inventive principles, a logical separation between pages, such as an implicit page break, is introduced to separate one handwriting session from another handwriting session. Keeping handwriting, or notes, from different sessions separate, is desirable when a user reduces or increases the line heights of the digitally displayed text thereby causing the page content, including any digitally captured handwriting, to shrink or grow relative to the size of a displayed page.

Various steps may be performed in accordance with certain inventive principles to determine appropriate circumstances for inserting a logical separation, such as an implicit page break, between pages of content, such as handwritten notes, entered during separate handwriting sessions. Upon a user beginning to enter handwritten text on a new page, a determination is made as to whether there is a page of handwritten text preceding the new page. If there is no previous or preceding page before the new page of notes, then an implicit page break is not inserted at the beginning of the new page of notes.

If the user leaves more than a predetermined amount of blank space at the bottom of the page immediately preceding the new page, then an implicit page break may be inserted at the beginning of the new page. An inserted implicit page break, is preferably able to display a page break marker or some other symbol within a user's notes to let the user know where an implicit page break has been automatically inserted. A user is preferably able to remove automatically inserted implicit page breaks. In addition to selecting and deleting the implicit page break symbol, a user may remove an implicit page break by dragging content from the page with the implicit page break onto the previous page of notes.

The amount of blank space left at the end of the preceding page may be combined with other criteria to determine whether to insert an implicit page break. Drawings may be treated differently than handwritten text in the form of letters, numbers, symbols, words, and the like. If a user enters handwritten text, as opposed to a drawing, at the beginning of a new page, this can be handled as a situation in which an implicit page break should be inserted if a first threshold for blank space at the bottom of the previous page is exceeded. If a user enters a drawing at the top of the new page, this can be interpreted as a situation in which the threshold amount of blank space left at the bottom on the preceding page should be increased. This increased threshold accounts for the increased height of drawings in general relative to handwritten text. Further, the amount by which the threshold is increased may be based upon the height of the drawing.

The amount of time elapsed since ink has been captured and/or handwriting has been recognized on the previous page is another factor that may be used by itself or combined with other factors to determine whether to insert an implicit page break into the new page. If the amount of elapsed time since handwritten ink has been captured on a previous page exceeds a threshold, which may be user selectable, then an implicit page break could be inserted into the new page.

A change in context is a factor that may be considered in determining whether to insert an implicit page break. A change of context may include the user entering a date or a label, such as a document title, a matter reference number, a subject or "Re:" line, and the like.

A user may insert a new empty page between two previously existing pages. Under these circumstances, an implicit page break is preferably inserted at the top of the newly inserted empty page and at the top of the page following the newly inserted page.

Although pages of handwritten text are described as being separated by implicit page breaks inserted at the beginning of a page, other suitable indications of a logical separation between two pages could also be used.

Additional features and advantages of the invention will be apparent upon reviewing the following detailed description.

DETAILED DESCRIPTION OF THE INVENTION

Figure 1:
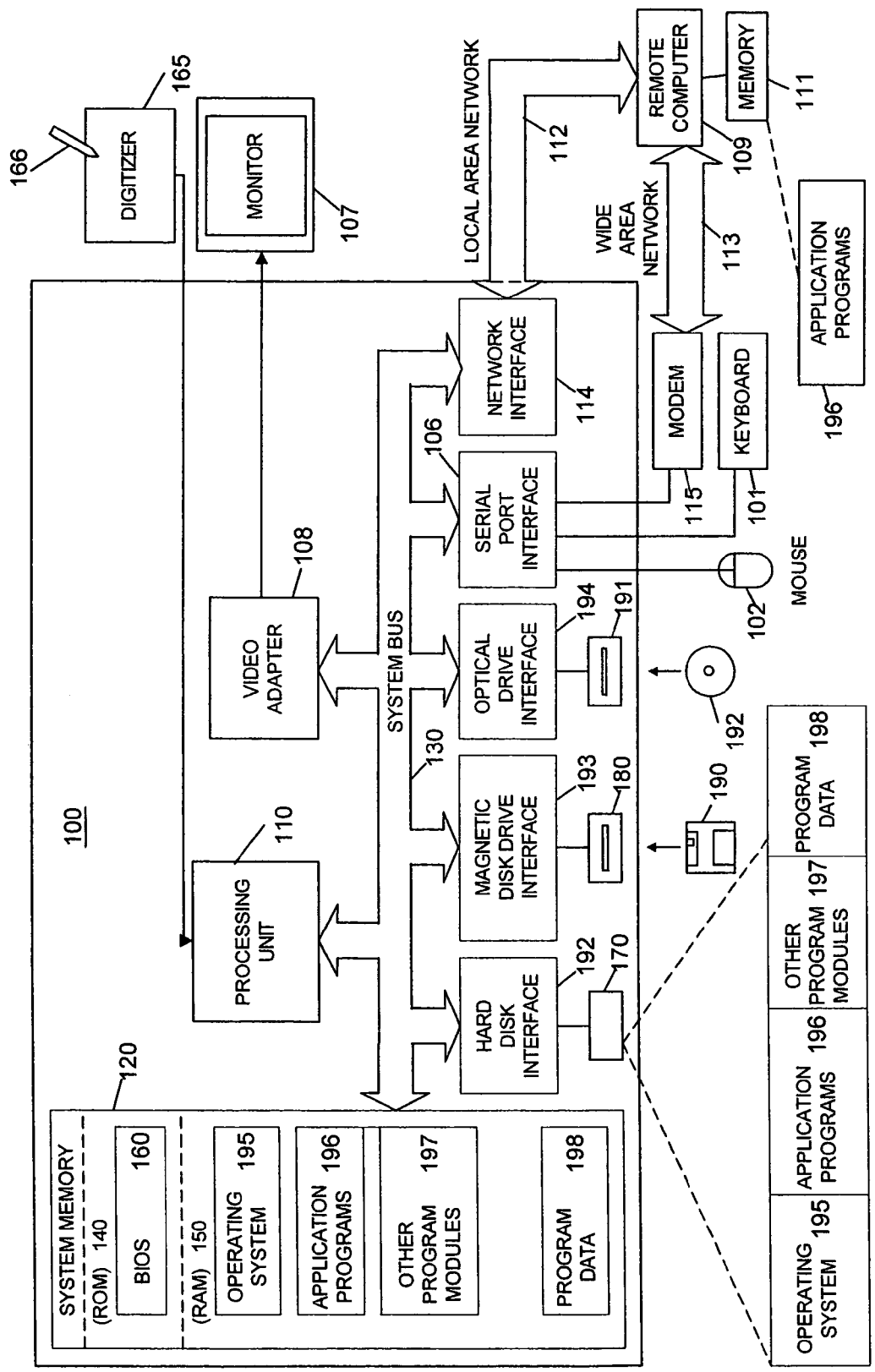
FIG. 1 is a schematic block diagram of a conventional general-purpose digital computing environment that can be used to implement various aspects of the present invention.

The present invention may be more readily described with reference to FIGS. 1–8. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing communication over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
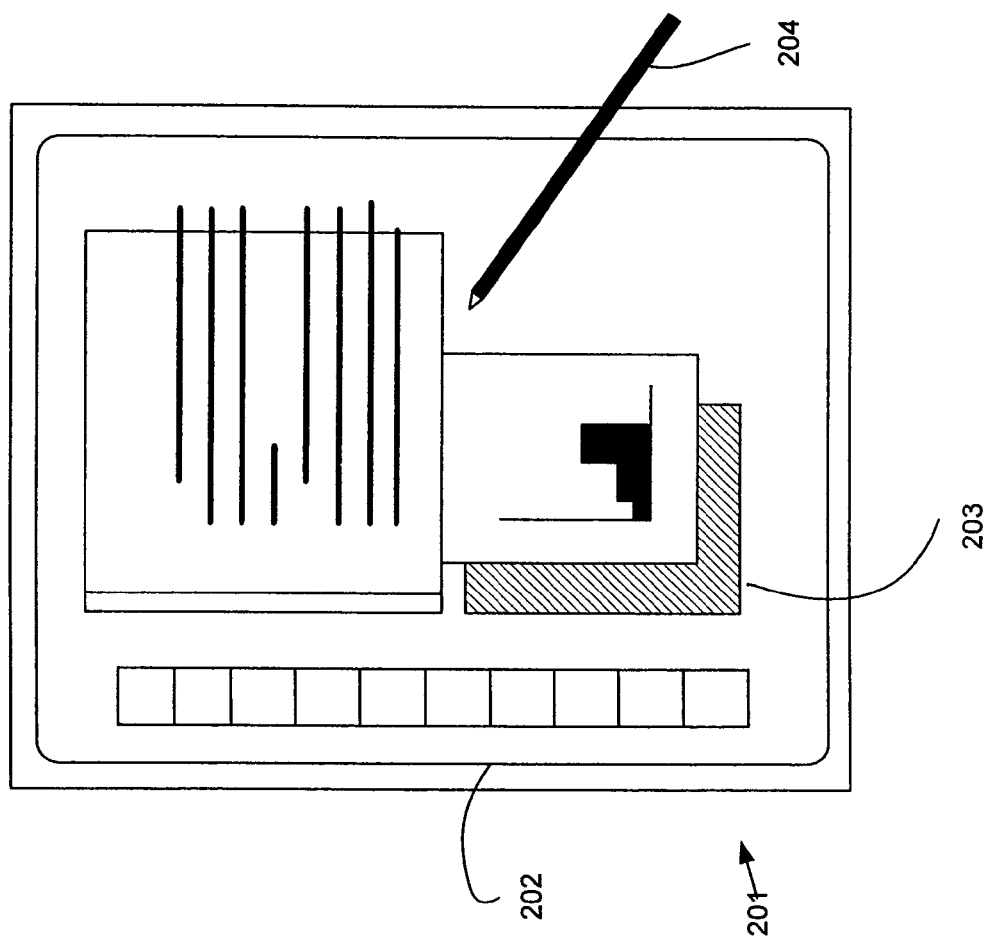
FIG. 2 illustrates a tablet and stylus computer that can be used in accordance with various aspects of the present invention.

FIG. 2 illustrates a tablet and stylus computer that can be used in accordance with various aspects of the present invention. Any or all of the features, subsystems, and functions in the system of FIG. 1 can be included in the computer of FIG. 2. The computer 201 includes a large display surface 202, e.g., a digitizing flat panel display, preferably, a liquid crystal display (LCD) screen, on which a plurality of graphical user interface windows 203 is displayed. The display is preferably oriented in "portrait" mode (i.e., vertically), as opposed to "landscape" mode (i.e., horizontally). Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Additionally, a user's own finger could be used for selecting or indicating portions of the displayed image on a touch-sensitive or proximity-sensitive display.

Figure 3:
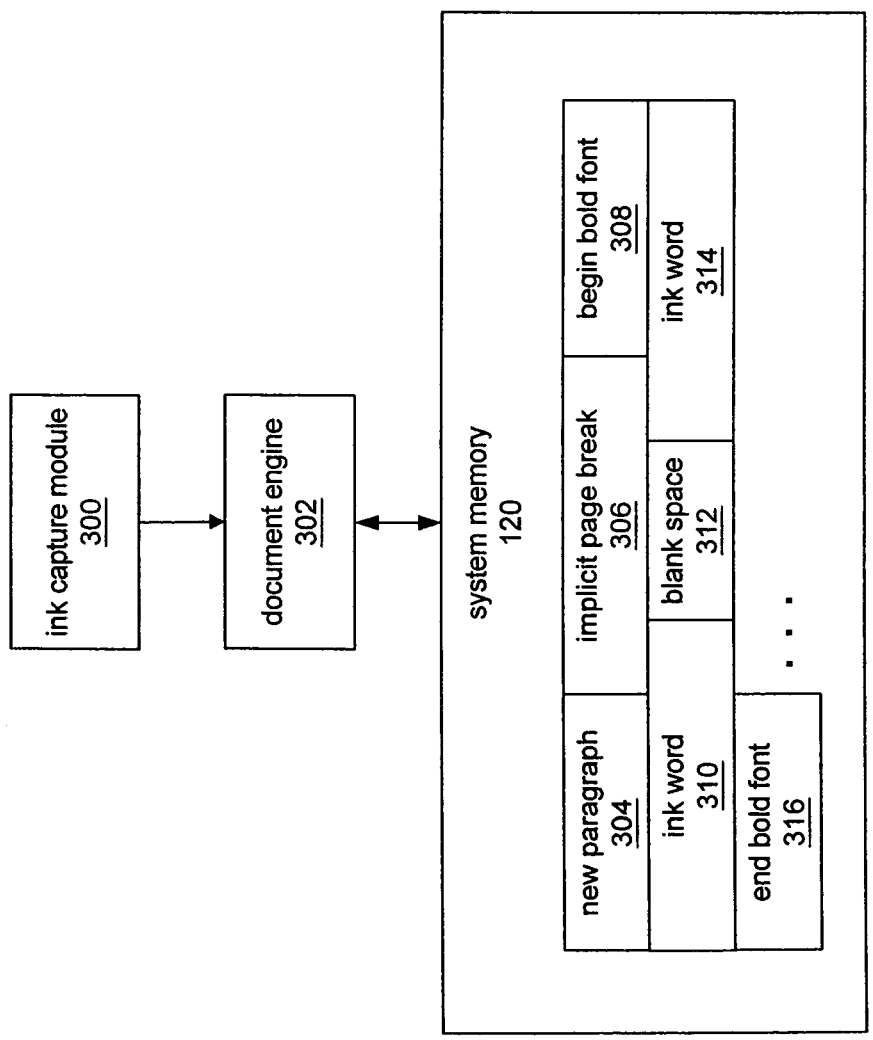
FIG. 3 is simplified schematic block diagram of an ink capture module and a document engine for inserting implicit page breaks in accordance with various inventive principles.

FIG. 3 depicts data flow in a simplified schematic diagram of a system in accordance with principles of the invention. An Ink capture module 300 captures handwritten text and drawings and, upon recognizing that handwritten text has been entered, provides a document engine 302 with the captured ink information. The document engine 302 then preferably recognizes portions of the captured ink information as handwritten characters, symbols, gestures, words, and the like and stores corresponding tokens, such as tokens 304–316, in system memory 120, for instance, based upon the information received from the ink capture module 300. The respective meanings of the following tokens are well known in the art: new paragraph token 304, begin bold font 308, blank space 312, and end bold font 316. Ink words 310 and 314 are tokens symbolizing textual words input by a user in any of various input methods as described below.

The document engine 302 preferably accesses the tokens and other pertinent information, as described below, in order to determine whether to store an indication of a logical separation between pages of handwritten text, drawings, and/or other information. Such a logical separation may take the form of an implicit page break, such as implicit page break 306 depicted in FIG. 3, in accordance with various principles of the invention discussed in more detail below.

As discussed above, Tablet PC's may be used to advantage for taking handwritten notes. In FIGS. 4A–4D, handwritten notes are displayed as pages on the display 202 of Tablet PC 201. The pages may be consecutively numbered, as in a laboratory notebook, for instance. Page numbers 400-1 through 400-4 designate consecutive pages of handwritten notes numbered 001–004.

Handwritten notes are depicted symbolically by the repeated occurrence of the word "NOTES." Although various inventive principles are discussed in the context of handwritten note-taking sessions, the invention is not limited to note taking. Instead, principles of the invention also apply to other forms of digitally represented handwriting, such as letters, memoranda, and other types of handwritten documents.

Figure 4B:
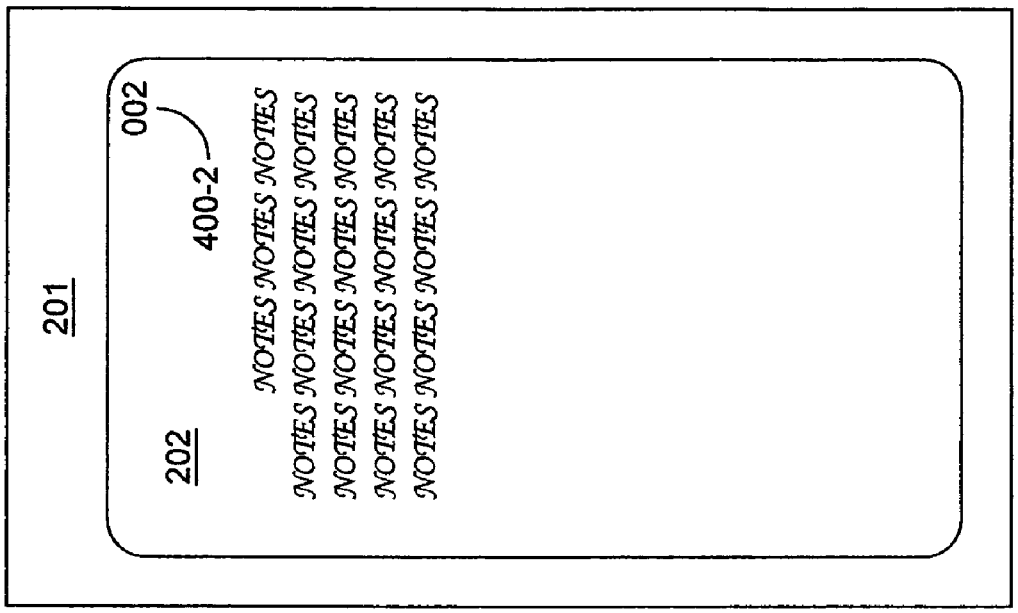
FIGS. 4A and 4B depict respective first and second pages of a first exemplary note-taking session.
Figure 4A:
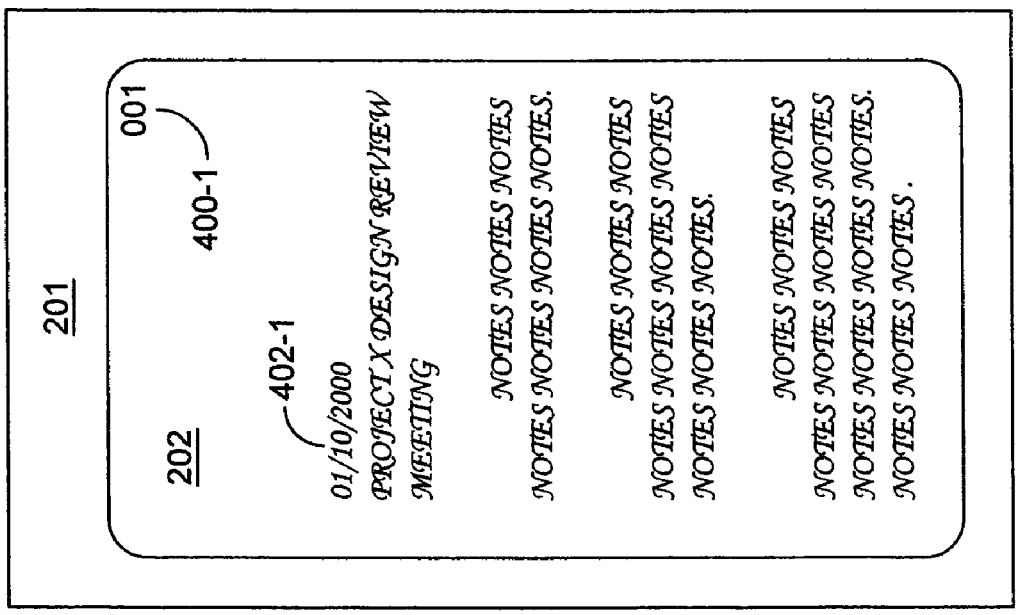

During a note taking or writing session, a Tablet PC user could write on a first page, such as page 001 displayed in FIG. 4A, "turn" or "flip" to another page, such as page 002 displayed in FIG. 4B, and continue to take notes. In other words, a user may write on one or more pages during a single handwriting or note-taking session.

A typical example of a handwriting session is meeting notes from a particular meeting. Notes for a different meeting would typically be considered a separate handwriting, or note taking, session. Another typical example of a note-taking session would be a student attending a class. The student attending a different class would typically be considered a separate note-taking session. Similarly, separate memoranda, and/or letters, on different subjects are other examples of handwriting sessions that are preferably considered to be separate from one another.

Figure 4D:
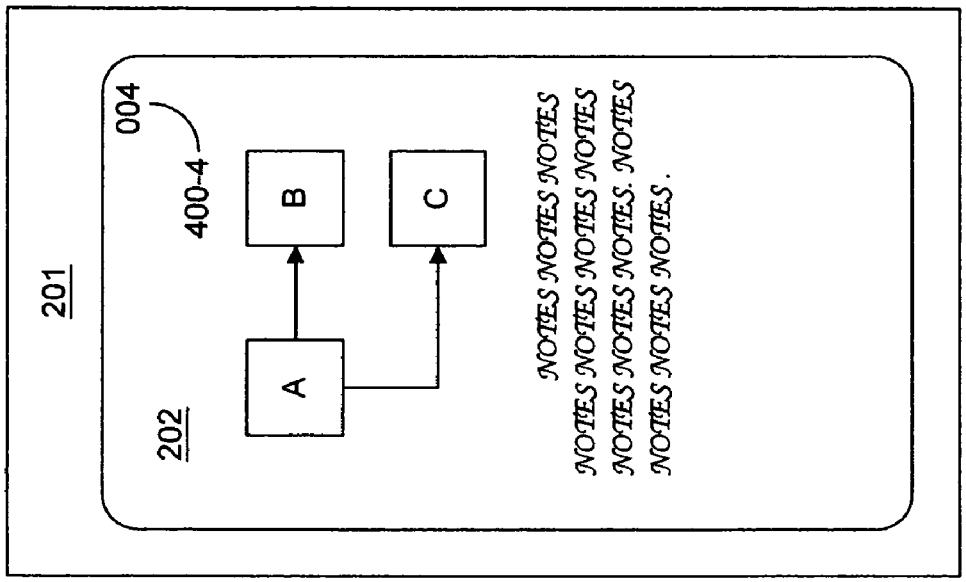
FIGS. 4C and 4D depict respective first and second pages of a second exemplary note-taking session.
Figure 4C:
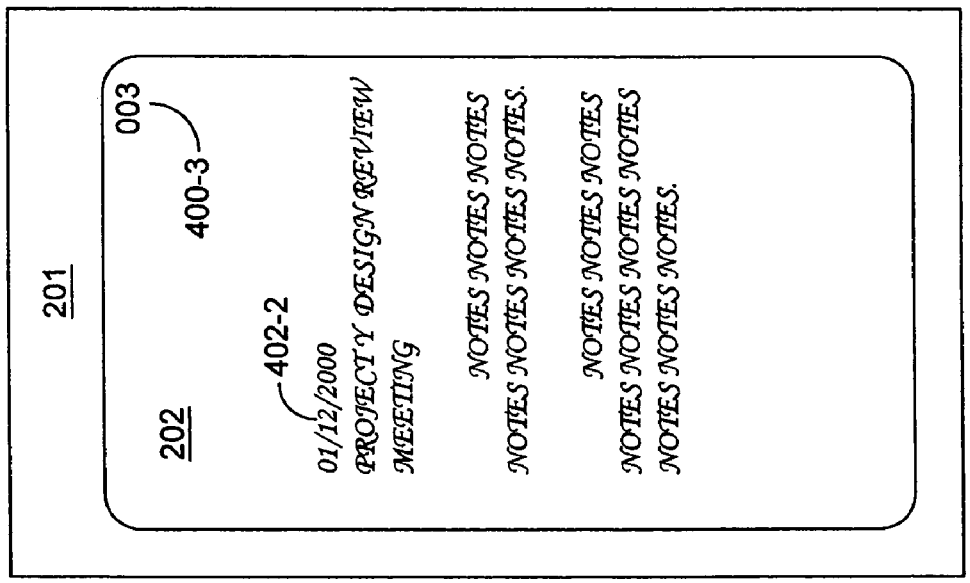

In accordance with various inventive principles, a logical separation between pages, such as an implicit page break, is introduced to separate one handwriting session from another handwriting session. Keeping handwriting, or notes, from different sessions separate, is desirable when a user reduces or increases the line heights of the digitally displayed text thereby causing the page content, including any digitally captured handwriting, to shrink or grow relative to the size of a displayed page. An example is changing the line height from standard line height to college rule line height. Such a change of line height results in a smaller line height, which in turn causes the handwritten or inked text to scale smaller, thereby fitting more page content on a displayed page. If the user writes on pages 001 and 002 as shown in FIGS. 4A and 4B during a first note-taking session and starts a second note-taking session on page 003 as shown in FIG. 4C, when changing line heights, changing the zoom or scale of the displayed text, or causing a re-flowable edit operation, the original content of page 003 preferably remains on its own page, separate from the notes entered onto pages 001 and 002.

Figure 5B:
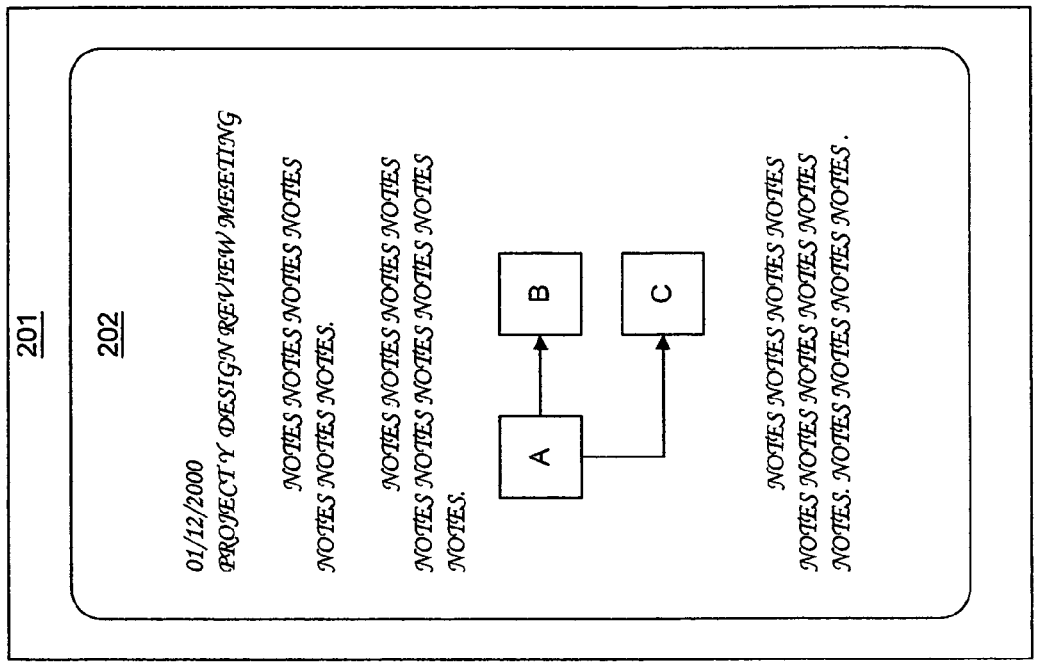
FIGS. 5A and 5B depict the handwritten notes from the first note-taking session and the second note-taking session, displayed separately.
Figure 5A:
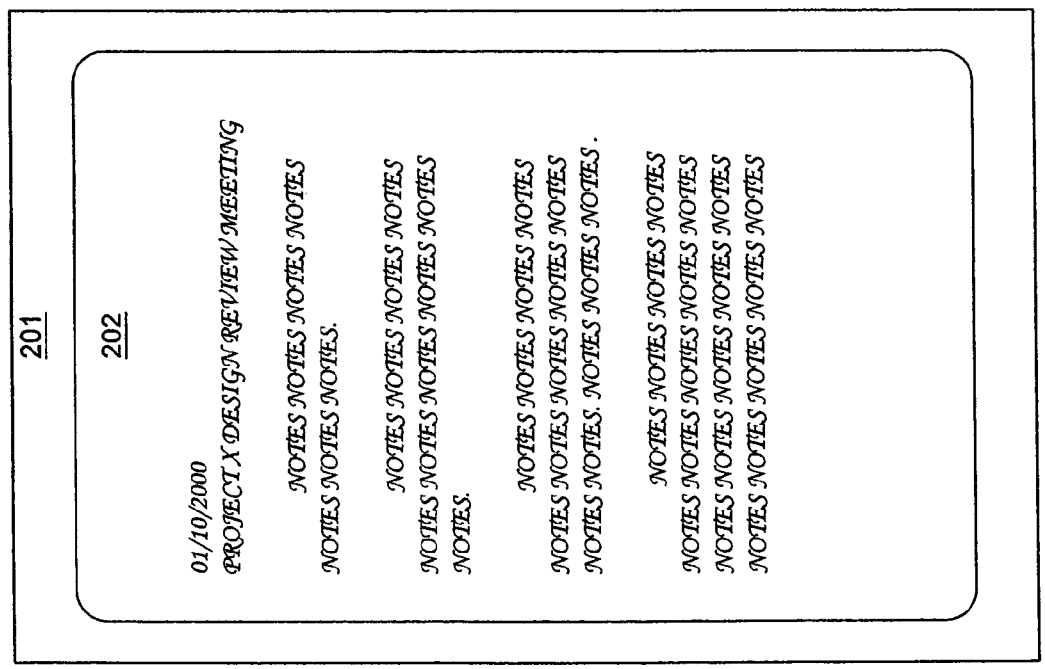
Figure 6B:
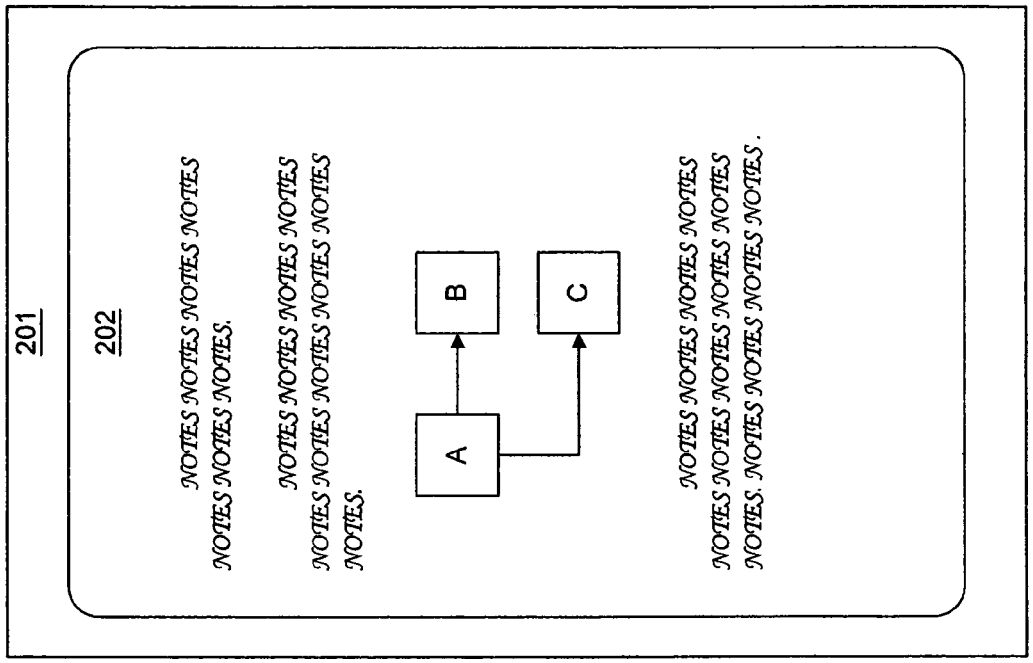
FIG. 6B depicts the portion of the handwritten notes from the second note-taking session that was not displayed in FIG. 6A.
Figure 6A:
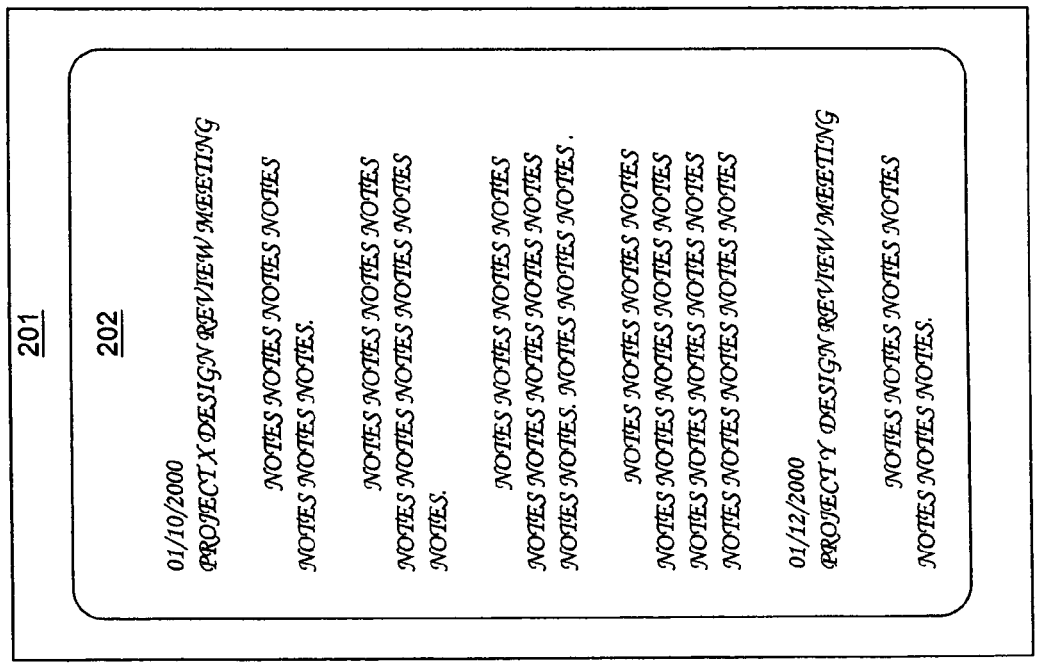
FIG. 6A depicts handwritten notes from both the first note-taking session and the second note-taking session displayed simultaneously.

FIG. 5A depicts the text originally entered onto pages 001 and 002 as part of a single note-taking session in a view that is zoomed out, such as in a text reading mode, as opposed to a text entering mode, on a single displayed page. There is room at the bottom of the displayed page to include at least some of the text entered on page 003, which was part of a separate note-taking session. In accordance with various inventive principles, however, a logical separation is stored to indicate that the text on pages 001 and 002 (FIGS. 4A and 4B) is from a separate note-taking session than the text on pages 003 and 004 (FIGS. 4C and 4D). Such a logical separation prevents text from the top of page 003 from being displayed at the bottom of the zoomed out display of pages 001 and 002 of the first note-taking session. As shown in FIGS. 5A and 5B, due to the stored logical separation of pages, notes entered as part of the second note-taking session are not displayed at the bottom of FIG. 5A even though there is enough room to display text from the second session there.

Unlike FIGS. 5A and 5B, FIGS. 6A and 6B depict how text would be displayed absent storage of a logical separation between the two note-taking sessions. Text entered as part of the second note-taking session is undesirably shown at the bottom of the same zoomed out page (FIG. 6A) as notes taken during the first session.

Figure 7:
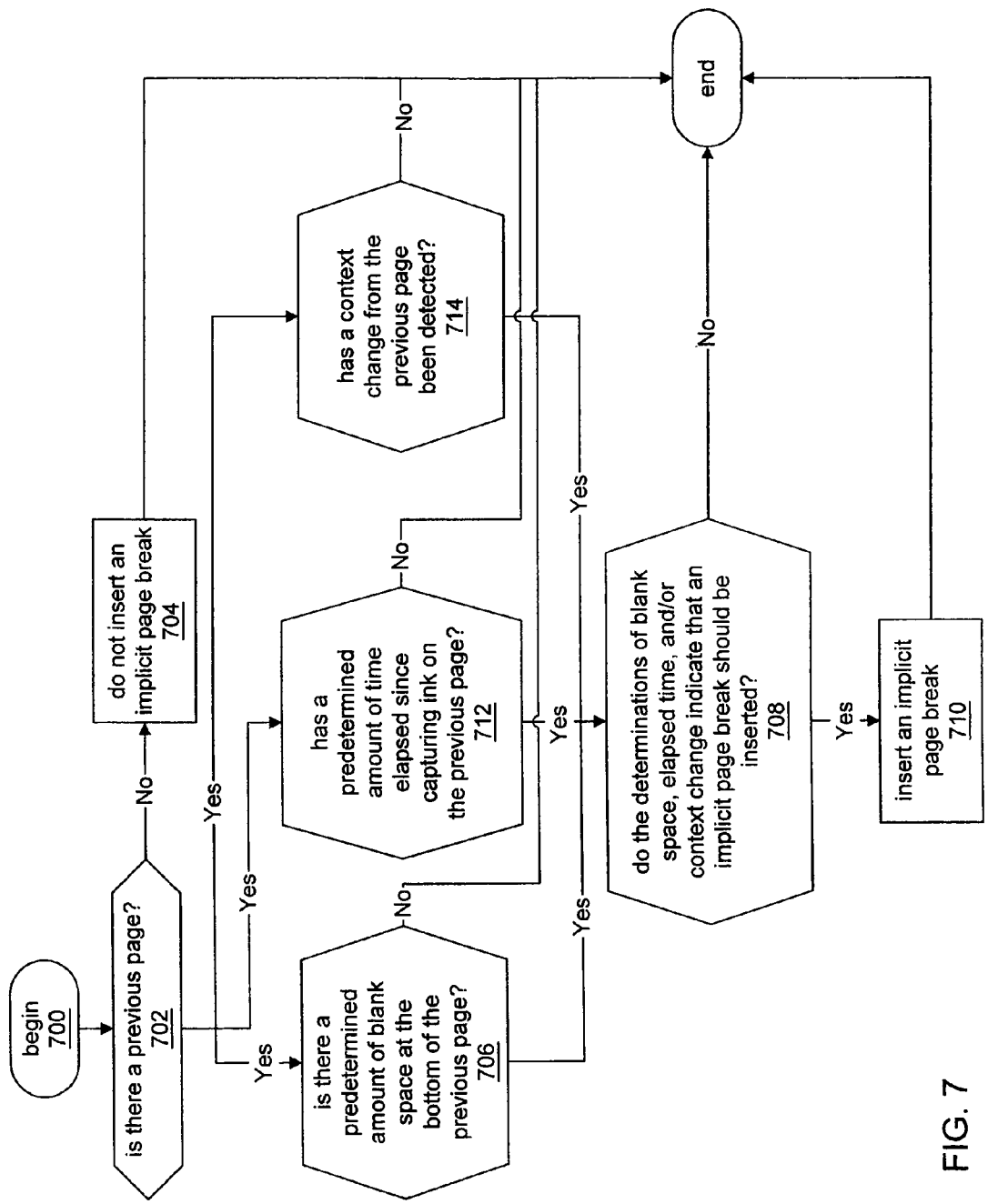
FIG. 7 is a flow chart showing steps for determining whether to insert an implicit page break in accordance with various inventive principles.

FIG. 7 depicts steps that may be performed by a Tablet PC, as in FIGS. 1 and 2, in accordance with various principles of the invention, to determine appropriate circumstances for inserting a logical separation, such as an implicit page break, between pages of content entered during separate handwriting sessions. Pertinent processing begins upon a user beginning to enter handwritten text on a new page, which is depicted in FIG. 7 at step 700. If there is no previous or preceding page before the new page of notes, then an implicit page break is not inserted at the beginning of the new page of notes, as depicted by steps 702 and 704.

Figure 8:
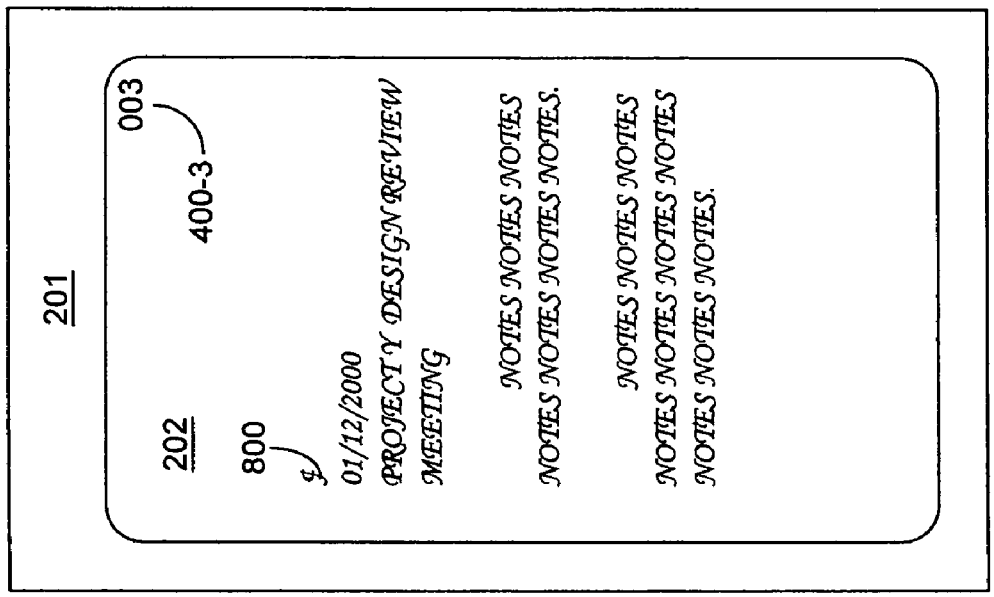
FIG. 8 depicts the first page of the second note-taking session similar to FIG. 4B with a visual indication that an implicit page break has been inserted at the beginning of the page.

If the user leaves more than a predetermined amount of blank space at the bottom of the page immediately preceding the new page, then an implicit page break may be inserted at the beginning of the new page, as depicted at steps 706, 708, and 710. An inserted implicit page break is preferably able to display a page break marker or some other visual indication within a user's notes to let the user know where implicit page breaks have been automatically inserted. For instance, FIG. 8 shows the page of notes as in FIG. 4C with an implicit page break symbol 800 indicative of an implicit page break having been inserted at the beginning of the page of notes displayed in FIG. 8. A user is preferably able to remove automatically inserted implicit page breaks. In addition to selecting and deleting the implicit page break symbol 800, a user may remove an implicit page break by dragging content from the page with the implicit page break onto the previous page of notes.

Step 708 optionally combines the amount of blank space left at the end of the preceding page with other criteria to determine whether to insert an implicit page break. Step 708 may be omitted. Alternatively, step 708 may be used to handle drawings differently than handwritten text in the form of letters, numbers, symbols, words, and the like. Unlike drawings, such handwritten inked text typically re-flows, much in the nature that a word processor wraps words that do not fit on a single line onto multiple lines within a single paragraph. Anything that is not handwritten text may be considered a drawing. A parsing component may be used to distinguish between handwritten text and drawings.

If a user enters handwritten ink or text at the beginning of a new page, as depicted in FIG. 4B, this can be handled as a situation in which an implicit page break should be inserted if a first threshold for blank space at the bottom of the previous page is exceeded. For instance, if more than one quarter of the bottom portion of a page of handwritten text is left blank, an implicit page break could be inserted at the beginning of the following page. If a user enters a drawing at the top of the new page, as depicted in FIG. 4D, this can be interpreted as a situation in which the threshold amount of blank space left at the bottom on the preceding page should be increased. This increased threshold accounts for the increased height of drawings in general relative to handwritten text. Further, the amount by which the threshold is increased may be based upon the height of the drawing. For instance, the height of the drawing inserted at the top of the new page could be measured and added to the first threshold to calculate an applicable increased threshold. As will be apparent, other suitable heuristics may also be applied to distinguish between separate note-taking or handwriting sessions. For instance, if a page of handwritten text includes a number of lines of text, then the number of lines of text that are left blank at the bottom of the preceding page can be used in determining whether or not to insert an implicit page break.

As depicted at steps 712, 708, and 710, the amount of time elapsed since ink has been captured and/or handwriting has been recognized on the previous page is another factor that may be used by itself or combined with other factors to determine whether to insert an implicit page break into the new page. If the amount of elapsed time since handwriting has been recognized on a previous page exceeds a threshold, which may be user selectable, then an implicit page break could be inserted into the new page.

Similarly, steps 714, 708, and 710, depict detection of a change in context as a factor to be considered in determining whether to insert an implicit page break. A change of context may include the user entering a date 402-1 (FIG. 4A) and 402-2 (FIG. 4C) or a label, such as a document title, a matter reference number, a subject or "Re:" line, and the like.

In accordance with principles of the invention, a user's handwritten notes may be automatically recognized at user selectable intervals in any suitable manner in order to provide information that can be used in determining whether a new context exists for the new page relative to the previous page. Several of such handwriting recognition techniques are known to those skilled in the art.

A user may insert a new empty page between two previously existing pages. Under these circumstances, an implicit page break is preferably inserted at the top of the newly inserted empty page and at the top of the page following the newly inserted page.

Although pages of handwritten text are described as being separated by implicit page breaks inserted at the beginning of a page, other suitable indications of a logical separation between two pages could also be used. For instance, an implicit page break could be stored at the end of a preceding page instead of at the beginning of a succeeding page.

What has been described above is merely illustrative of the application of the principles of the present invention. Those skilled in the art can implement other arrangements and methods without departing from the spirit and scope of the present invention. Any of the methods of the invention can be implemented in software that can be stored on computer disks or other computer-readable media. No claim should be interpreted to be in means-plus-function format.

The invention claimed is:

1. A computer-readable medium having computer-executable instructions for logically separating a first page of digitally represented handwriting from a second page of digitally represented handwriting by performing steps comprising:
   determining whether at least a predetermined amount of blank space is present between digitally represented handwriting on the first page and a bottom of the first page;
   determining whether at least a predetermined amount of time elapsed between capturing ink on the first page and capturing ink on the second page;
   determining whether a context change occurred between recognizing handwriting on the first page and recognizing handwriting on the second page; and
   storing an indication that the first page and the second page are logically separate if at least one condition is satisfied, the at least one condition being selected from the group consisting of:
   there is more than the predetermined amount of blank space present between digitally represented handwriting on the first page and a bottom of the first page,
   more than the predetermined amount of time elapsed between capturing ink on the first page and capturing ink on the second page, and
   a context change is determined to exist between recognizing handwriting on the first page and recognizing handwriting on the second page.

2. The computer-readable medium of claim 1 having further computer-executable instructions for performing the steps of:
   detecting when a new page is inserted between a first existing page of digitally represented handwriting and a second existing page of digitally represented handwriting;
   storing an indication of a logical separation between the first existing page and the new page; and
   storing an indication of a logical separation between the new page and the second existing page.

3. The computer-readable medium of claim 1 having further computer-executable instructions for performing the steps of:
   displaying, on a display surface, either handwriting entered on the first page or handwriting entered on the second page, but not both handwriting entered on the first page and handwriting entered on the second page, based upon the stored indication of a logical separation between the first and second pages, even when there is sufficient display surface area to display simultaneously both handwriting entered on the first page and handwriting entered on the second page.

4. A method of inserting an implicit page break into digitally represented inked handwriting, the method comprising the steps of:
   responsive to capturing first ink on a new page, determining whether at least a first threshold amount of blank space is present between second ink on a page immediately preceding the new page and a bottom of the page immediately preceding the new page; and
   inserting an implicit page break indicating that the new page and the page immediately preceding the new page are logically separate if there is more than the first threshold amount of blank space present between the second ink on the page immediately preceding the new page and the bottom of the page immediately preceding the new page.

5. The method of claim 4, wherein the step of inserting the implicit page break includes inserting the page break above the first ink on the new page.

6. The method of claim 4 further comprising the steps of:
   determining whether the topmost first ink on the new page is a drawing; and
   inserting an implicit page break indicating that the new page and the page immediately preceding the new page are logically separate if there is more than a second threshold amount of blank space present between the second ink on the page immediately preceding the new page and the bottom of the page immediately preceding the new page, wherein the second threshold amount of blank space is greater than the first threshold amount of blank space.

7. The method of claim 6, wherein the step of inserting the implicit page break if there is more than the second threshold amount of blank space present between the second ink on the page immediately preceding the new page and the bottom of the page immediately preceding the new page includes inserting the page break above the first ink on the new page.

8. The method of claim 6 further comprising the steps of:
   responsive to determining that a drawing is the topmost first ink on the new page, determining a height of the drawing; and
   setting an amount by which the second threshold amount of blank space is greater than the first threshold amount of blank space based upon the height of the drawing.

9. A method of inserting an implicit page break into digitally represented inked handwriting, the method comprising the steps of:
   responsive to capturing ink on a new page, determining whether at least a threshold amount of time elapsed between capturing the ink on the new page and capturing ink on a page of ink immediately preceding the new page; and
   inserting an implicit page break indicating that the new page and the page immediately preceding the new page are logically separate if more than the threshold amount of time elapsed between capturing ink on the page immediately preceding the new page and capturing ink on the new page.

10. A method of inserting an implicit page break, the method comprising the steps of:
    responsive to capturing ink on a new page, determining whether a context change occurred between recognizing ink on a page preceding the new page and recognizing ink on the new page; and
    inserting an implicit page break indicating that the new page and the page immediately preceding the new page are logically separate if a context change occurred between recognizing ink on the page preceding the new page and recognizing ink on the new page.

11. The method of claim 10 wherein the step of determining whether a context change has occurred between the new page and the page preceding the new page includes
    recognizing a first context on the page preceding the new page; and recognizing a second context on the new page, wherein the second context is different than the first context.

12. The method of claim 10 further comprising the step of:
displaying, on a display surface, either the ink entered on the new page or ink entered on a preceding page, but not both ink entered on the new page and ink entered on the page preceding the new page, based upon the inserted implicit page break, even when there is sufficient display surface area to display simultaneously both ink entered on the new page and ink entered on the page preceding the new page.

13. A method of inserting an implicit page break, the method comprising the steps of:
responsive to capturing ink on a new page, determining whether at least a threshold amount of blank space is present between ink captured on a page immediately preceding the new page and a bottom of the page immediately preceding the new page;
determining whether at least a threshold amount of time elapsed between capturing ink on the page immediately preceding the new page and capturing ink on the new page;
determining whether a context change occurred between recognizing ink on the page immediately preceding the new page and recognizing ink on the new page; and
inserting an implicit page break if at least one condition is satisfied, the at least one condition being selected from the group consisting of:
there is more than the threshold amount of blank space present between ink captured on a page immediately preceding the new page and the bottom of the page immediately preceding the new page,
more than the threshold amount of time elapsed between capturing ink on the immediately preceding page and capturing ink on the new page, and
a context change is determined to exist between recognizing ink on the page preceding the new page and recognizing ink on the new page.

14. The method of claim 13, wherein the page immediately preceding the new page is adjacent to the new page.

15. The method of claim 13, further comprising the steps of:
detecting when a page is inserted, thereby producing an inserted page, between a first existing page and a second existing page;
inserting an implicit page break substantially at the beginning of the inserted page; and
inserting an implicit page break substantially at the beginning of the second existing page.

* * * * *

UNITED STATES PATENT AND TRADEMARK OFFICE
CERTIFICATE OF CORRECTION

PATENT NO. : 6,990,237 B2
APPLICATION NO. : 10/866130
DATED : January 24, 2006
INVENTOR(S) : Charlton E. Lui et al.

Page 1 of 1

It is certified that error appears in the above-identified patent and that said Letters Patent is hereby corrected as shown below:

On the title page, in "Primary Examiner", in column 2, line 1, delete "Miriam" and insert -- Mariam --, therefor.

Signed and Sealed this

First Day of September, 2009

David J. Kappos
*Director of the United States Patent and Trademark Office*